United States Patent
Sakamoto et al.

(10) Patent No.: US 11,768,342 B2
(45) Date of Patent: Sep. 26, 2023

(54) OPTICAL MULTIPLEXING CIRCUIT AND OPTICAL SOURCE

(71) Applicant: Nippon Telegraph and Telephone Corporation, Tokyo (JP)

(72) Inventors: Junji Sakamoto, Musashino (JP); Naru Nemoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/917,034

(22) PCT Filed: May 18, 2020

(86) PCT No.: PCT/JP2020/019672
§ 371 (c)(1),
(2) Date: Oct. 5, 2022

(87) PCT Pub. No.: WO2021/234787
PCT Pub. Date: Nov. 25, 2021

(65) Prior Publication Data
US 2023/0152541 A1  May 18, 2023

(51) Int. Cl.
*G02B 6/42*  (2006.01)

(52) U.S. Cl.
CPC ......... *G02B 6/4286* (2013.01); *G02B 6/4215* (2013.01)

(58) Field of Classification Search
None
See application file for complete search history.

(56) References Cited

U.S. PATENT DOCUMENTS

| | | | | |
|---|---|---|---|---|
| 8,704,447 | B2 * | 4/2014 | Ide | G02B 6/12007 359/326 |
| 9,240,671 | B2 * | 1/2016 | Ide | H01S 5/02325 |
| 9,952,389 | B2 * | 4/2018 | Katsuyama | G02B 6/124 |
| 10,056,733 | B1 * | 8/2018 | Taylor | G02B 6/2813 |
| 10,408,999 | B2 * | 9/2019 | Katsuyama | G02B 6/124 |
| 10,649,144 | B2 * | 5/2020 | Sakamoto | G02B 6/2938 |
| 2012/0068609 | A1 * | 3/2012 | Ide | G02B 6/12004 315/152 |

(Continued)

FOREIGN PATENT DOCUMENTS

JP  2018-180513 A  11/2018

*Primary Examiner* — Jerry Rahll
(74) *Attorney, Agent, or Firm* — Workman Nydegger

(57) ABSTRACT

In a conventional RGB coupler, the split ratio largely depends on the wavelength. The split ratio of R and the split ratios of G and B are non-uniform because R has a wavelength far from those of G and B. Accordingly, a video display device needs to have the monitoring detection value corrected, making it difficult to use the monitoring function. A light combining circuit and a light source of this disclosure include a first splitting unit for splitting R wavelength light and a second splitting unit for splitting G and B combined light. They split monochromatic light of R and combined light of G and B, independently. G and B light from an LD are first combined by a preliminary wave-combining unit before being split. The split lights of each wavelength are combined by a main wave-combining unit, outputting RGB combined light. Each split light from the two splitting units is detected by a single PD.

20 Claims, 12 Drawing Sheets

(56) References Cited

U.S. PATENT DOCUMENTS

| 2015/0003773 A1* | 1/2015 | Klein | G02B 6/2938 |
| | | | 385/11 |
| 2018/0128979 A1* | 5/2018 | Heanue | G02B 6/12026 |

* cited by examiner

OPTICAL MULTIPLEXING CIRCUIT AND OPTICAL SOURCE

BACKGROUND ART

The present invention relates to a light combining circuit and a light source. More particularly, the present invention relates to a light combining circuit for combining light of multiple wavelengths such as light of three primary colors and monitoring the light intensity of each wavelength, and a light source including the light combining circuit.

As a light source for an eyeglass-type terminal or a small projector, a light source has become prevalent that includes laser diodes (LDs) outputting three primary colors light of R (red light), G (green light), and B (blue light).

FIG. 1 illustrates an exemplary light source for a projector using an LD. The projector light source includes LDs 1 to 3 that output single wavelength light of each color of R, G, and B, lenses 4 to 6 that collimate the respective light output from the LDs 1 to 3, and dichroic mirrors 10 to 12 that combine the respective light and output it to a MEMS mirror 16. The RGB light is bundled in one beam and swept by the MEMS mirror 16 or the like to project a video on a screen 17 while synchronizing LD modulation and sweep. Half mirrors 7 to 9 are inserted between the lenses 4 to 6 and dichroic mirrors 10 to 12. Split light of each color is monitored by photo diodes (PDs) 13 to 15 to adjust the white balance of the projected video.

It is general that in the LD, the light is monitored (front monitoring) before a resonator that emits light. As shown in FIG. 1, a light source including the RGB light sources includes bulk optical components combined with free space optics, such as the LDs 1 to 3, the lenses 4 to 6, the half mirrors 7 to 9, and the dichroic mirrors 10 to 12. In addition, the monitoring for adjusting the white balance needs bulk components such as the half mirrors 7 to 9 and PDs 13 to 15. Inclusion of a lot of bulk components leads to a larger optical system, which makes it difficult to provide a smaller light source.

Then, instead of the free space optics with the bulk components, an RGB coupler using a planar lightwave circuit (PLC) has drawn attention. The PLC includes a flat substrate such as Si that is subjected to patterning such as photolithography and reactive ion etching processing to fabricate an optical waveguide. A plurality of basic light circuits (such as a directional coupler and a Mach-Zehnder interferometer) can be combined to achieve various functions.

FIG. 2 illustrates a basic structure of an RGB coupler using the PLC. FIG. 2 illustrates an RGB coupler module including LDs 21 to 23 of G, B, and R colors and a PLC type RGB coupler 30. The RGB coupler 30 includes first to third waveguides 31 to 33 and first and second combiners 34 and 35 that combine light from two waveguides into one waveguide. Combined output light 36 is output from the chip end face. As a combiner, there are ways of using a symmetrical directional coupler having the same waveguide width, the Mach-Zehnder interferometer, and a mode coupler or the like.

Using the PLC shown in FIG. 2, a free space optics using the lenses and dichroic mirrors or the like as in FIG. 1 can be integrated on one chip 30. Because the LDs of R and G output less than the LD of B, an RRGGB light source is used that includes two LDs for each of R and G. Because a multiplex mode can be used to combine light of the same wavelength in different modes, the PLC can be used to easily achieve an RRGGB coupler as well.

FIG. 3 illustrates the configuration of an RGB coupler using two directional couplers. An RGB coupler 100 using the PLC includes first to third input waveguides 101 to 103, first and second directional couplers 104 and 105, and an output waveguide 106 connected to the second input waveguide 102.

The first directional coupler 104 couples light $\lambda 2$ incident from the first input waveguide 101 to the second input waveguide 102, couples light $\lambda 1$ incident from the second input waveguide 102 to the first input waveguide 101, and couples it again to the second input waveguide 102. The second directional coupler 105 couples light $\lambda 3$ incident from the third input waveguide 103 to the second input waveguide 102, and transmits light of $\lambda 1$ and $\lambda 2$ coupled to the second input waveguide 102 at the first directional coupler 104. The waveguide length, waveguide width, and inter-waveguide gap in each unit are designed to achieve the above operation.

For example, green light G (wavelength $\lambda 2$) is incident to the first input waveguide 101, blue light B (wavelength $\lambda 1$) is incident to the second input waveguide 102, and red light R (wavelength $\lambda 3$) is incident to the third input waveguide 103. Light of three colors R, G, and B are combined by the first and second directional couplers 104 and 105 into RGB combined light that is output from the output waveguide 106. For the wavelengths of $\lambda 1$, $\lambda 2$, and $\lambda 3$, light of 450 nm, 520 nm, and 638 nm is used, respectively. The inventors have proposed a configuration of the RGB coupler including the PLC that includes a monitoring function for the white balance adjustment (PTL 1).

FIG. 4 illustrates the configuration of a light source with the monitoring function in the conventional technologies. A light source with a monitoring function 210 includes first to third LDs $201_1$ to $201_3$ that output light of colors R, G, and B, respectively, a PLC type RGB coupler 210, and a PD 202 optically connected to the RGB coupler 210. The RGB coupler 210 includes input waveguides $211_1$ to $211_3$ corresponding to the respective colors, a wave-combining unit 214, and an output waveguide 215, and further includes a splitting unit 212 near the output waveguide 215. After propagating the output waveguide 215, combined light 203 is output. A part of the combined light 203 is split by the splitting unit 212 and input in the PD 202.

A configuration is also contemplated in FIG. 4 that light is split from the input waveguides $211_1$ to $211_3$ and monitored by three independent PDs for the respective colors. FIG. 4 shows a configuration that by directly monitoring the output from the output waveguide 215, there is no need to provide a monitoring circuit for each color. A smaller light source can be achieved, and by understanding the combining characteristics of the wave-combining unit 214, the white balance can be adjusted using the monitoring value of the PD 202.

CITATION LIST

Patent Literature

[PTL 1] Japanese Patent Application Publication No. 2018-180513, description

SUMMARY OF THE INVENTION

Technical Problem

Unfortunately, in the splitting unit 212, the split ratio largely depends on the wavelength, and the split ratio of R and the split ratios of G and B are non-uniform because R has a wavelength far from those of G and B. For example, for a splitting unit including a directional coupler that has a Normalized Index Difference of 0.45%, a waveguide width of 2 μm, an inter-waveguide gap of 2 μm, and a length that is set such that the split ratio for blue is 1%, the split ratio for three colors is R:G:B=23:5:1. Such a non-uniform split ratio makes it essential to correct the monitoring detection value in the PD 202 to use the light source in FIG. 4 in a video display device or the like and adjust the white balance. There is a problem that a detection value with a large width in the PD 202 is difficult to use as a monitoring function. Also, the PD requires a large dynamic range.

In view of the foregoing, it is an object of the present invention to provide a coupler with a monitoring function and a light source that are easily to use in a video display device and have a simplified configuration.

Means for Solving the Problem

To achieve the above purpose, one embodiment of the present invention is a light combining circuit comprising: a first splitting unit for splitting first wavelength light; a preliminary wave-combining unit for combining second wavelength light and third wavelength light; a second splitting unit for splitting the combined second wavelength light and third wavelength light; a main wave-combining unit for combining first split light from the first splitting unit and first split light from the second splitting unit; an output waveguide for outputting the combined light from the main wave-combining unit; a first monitoring waveguide for outputting second split light from the first splitting unit; and a second monitoring waveguide for outputting second split light from the second splitting unit.

In addition, another embodiment may be a light source with a monitoring function comprising: the above light combining circuit; three laser diodes for outputting the first wavelength light, the second wavelength light, and the third wavelength light, respectively; and a photo diode optically coupled to the first and second monitoring waveguides.

Effects of the Invention

As described above, the light combining circuit and light source of this disclosure may solve or reduce the problem of the wavelength dependence of the split ratio and provide a monitoring function that is easy to use in a video device.

DESCRIPTION OF EMBODIMENTS

A light combining circuit and a light source of this disclosure may achieve a very simplified configuration while avoiding the problem of the wavelength dependence of the splitting unit in the conventional technologies. A video device using the light source of this disclosure may largely reduce the wavelength dependence of the monitoring value to simplify the adjustment process of the white balance.

Figure 1:
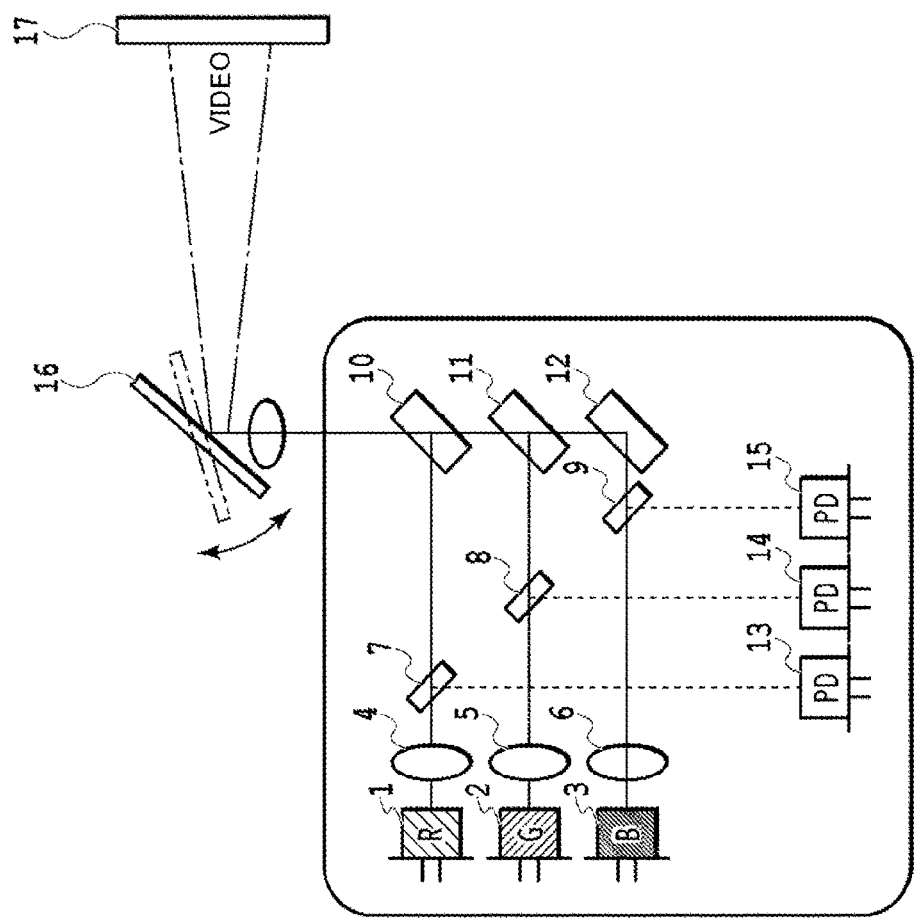
FIG. 1 illustrates a configuration of an exemplary light source for a projector using an LD.
Figure 2:
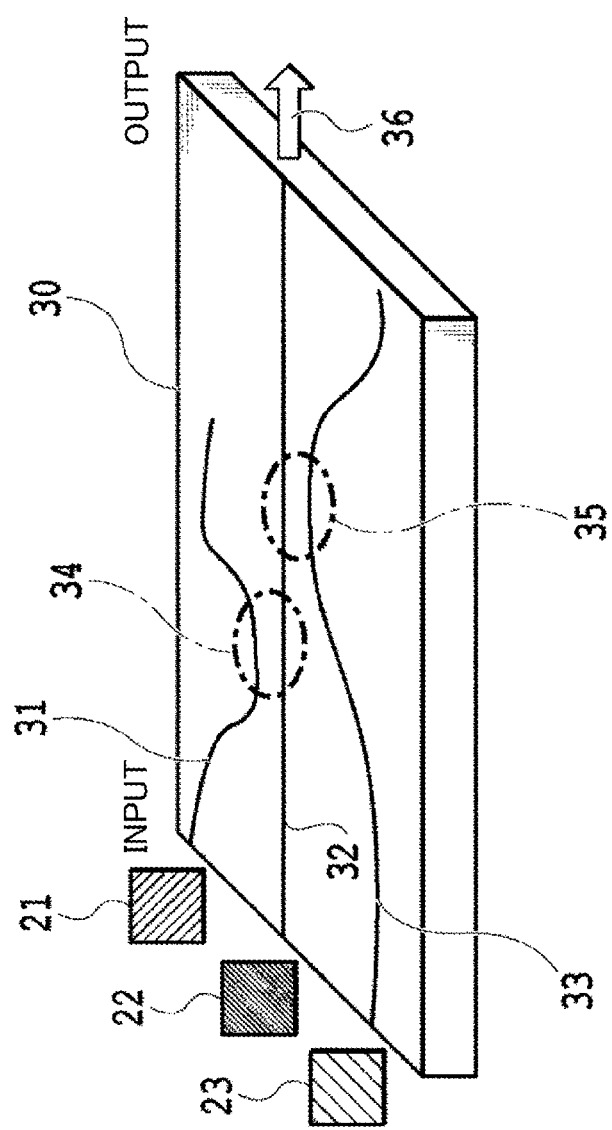
FIG. 2 illustrates the basic structure of an RGB coupler using a PLC.
Figure 3:
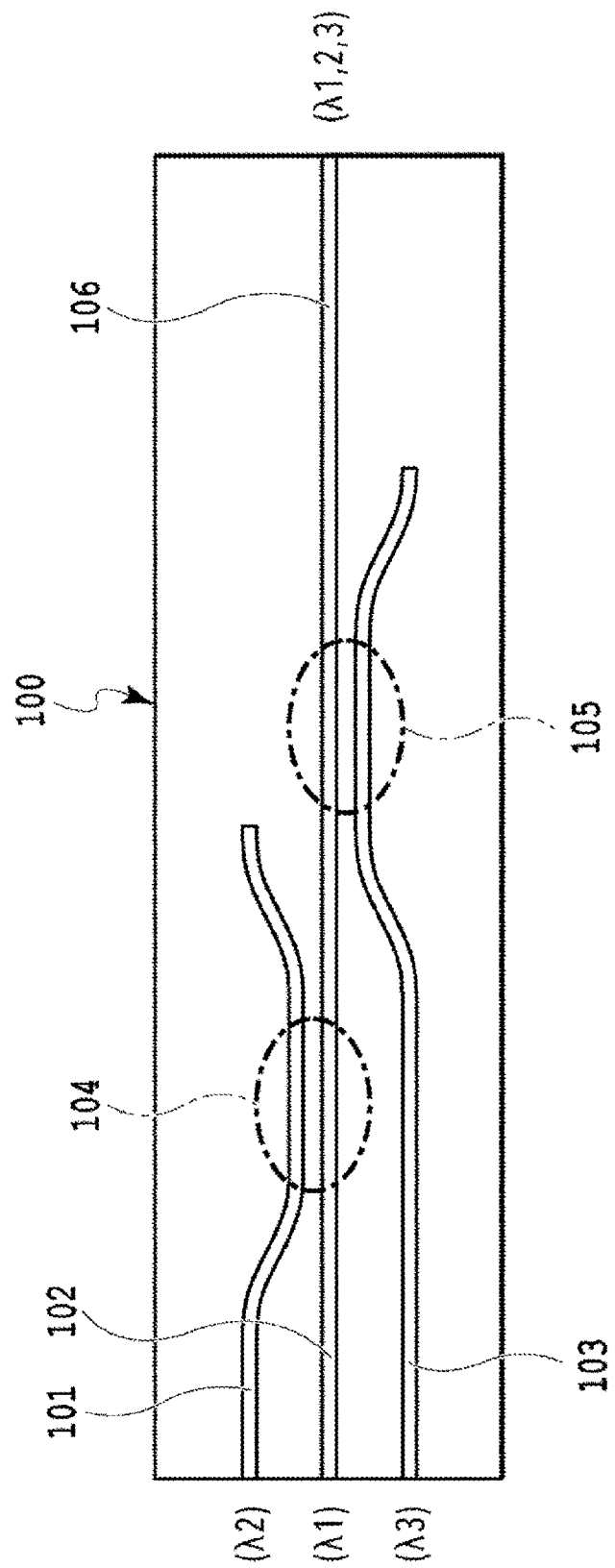
FIG. 3 illustrates a configuration of an RGB coupler using two directional couplers.
Figure 4:
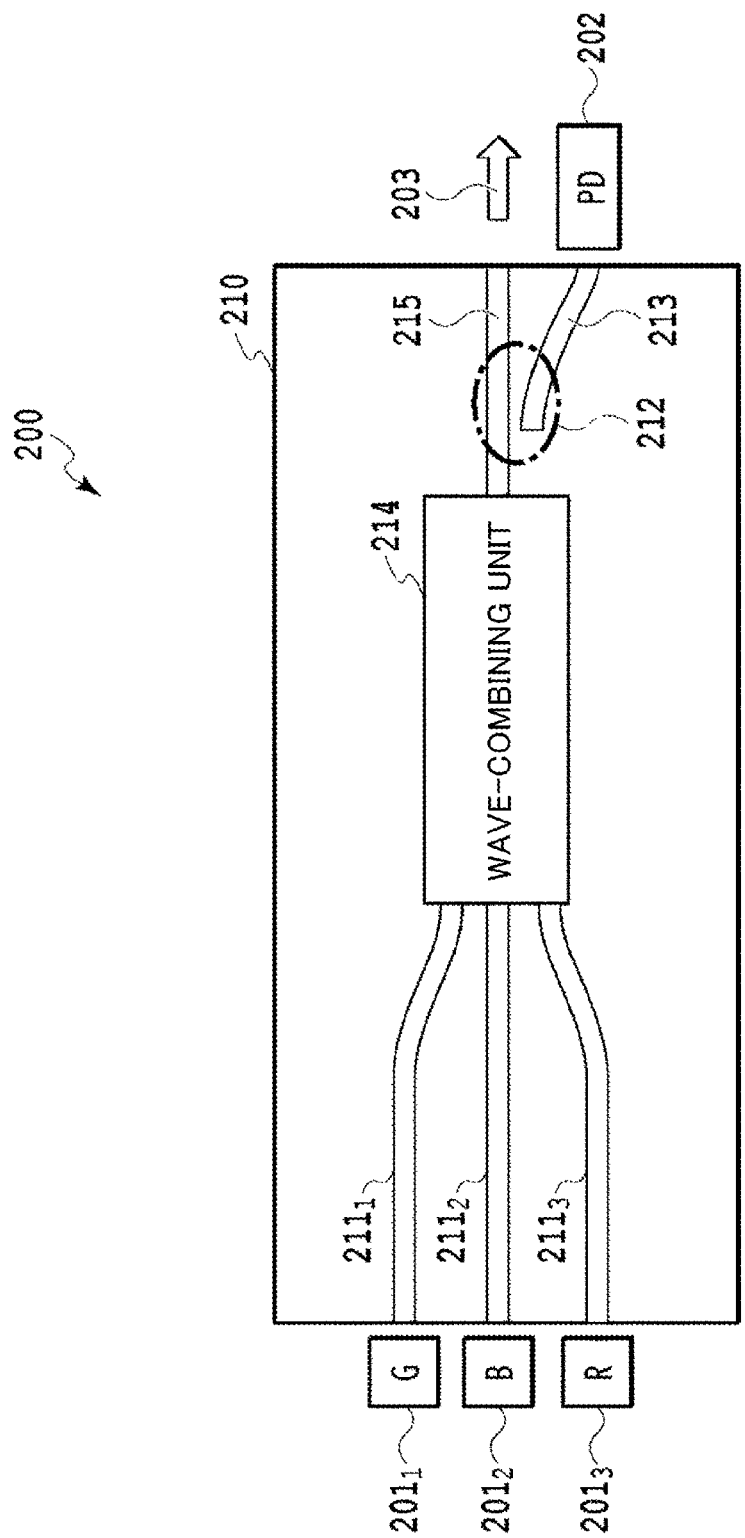
FIG. 4 illustrates a configuration of an RGB coupler with a monitoring function in the conventional technologies.

Referring again to the configuration of the light source in the conventional technologies in FIG. 4, the wave-combining unit 214 combines the three colors of R, G, and B and then the splitting unit 212 splits the monitor light, thus making it possible to monitor the output light 203 after passing through all components of the RGB coupler circuit 210. This configuration reflects all of the characteristics of the RGB coupler circuit 210 including the wave-combining unit 214, and thus is more preferable as a method of detecting the monitor light. Unfortunately, due to the wavelength dependence of the split ratio of the splitting unit 212, it is not easy to handle the monitoring value in the video device using this light source. To avoid the problem of the wavelength dependence of the split ratio of the splitting unit 212, it is also contemplated to split the three colors of R, G, and B by independent splitting units.

Figure 5:
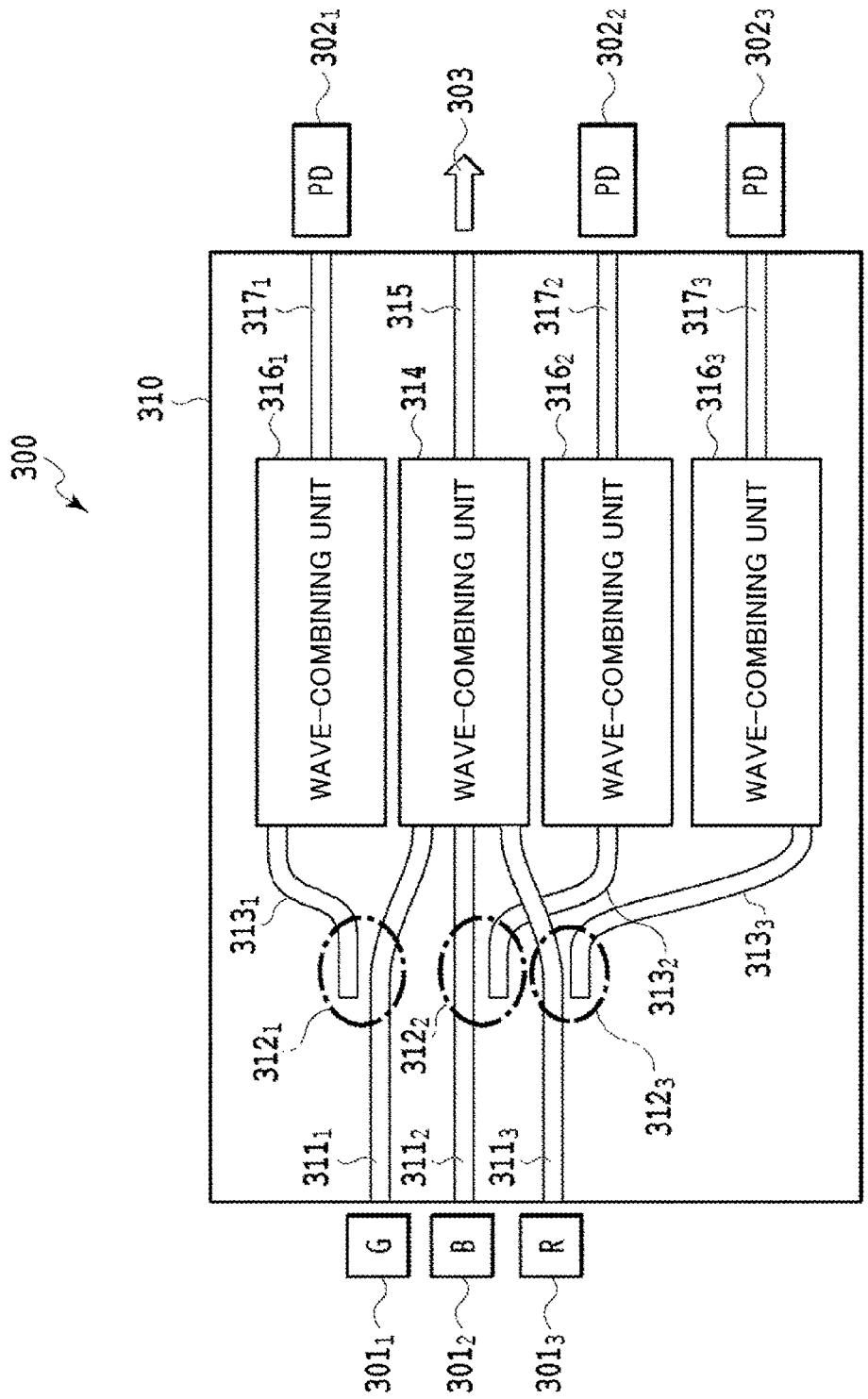
FIG. 5 illustrates another configuration of an RGB coupler with a monitoring function in the conventional technologies.

FIG. 5 illustrates another configuration of an RGB coupler with a monitoring function in the conventional technologies. The light source in FIG. 5 includes first to third LDs $301_1$ to $301_3$, a PLC type RGB coupler 310, and first to third PDs $302_1$ to $302_3$ optically connected to the RGB coupler 310. The RGB coupler 310 includes input waveguides $311_1$ to $311_3$ corresponding to the first to third LDs, first to third splitting units $312_1$ to $312_3$ that split light propagating the waveguides into two, a wave-combining unit 314 that combines first one of the respective light split by the first to third splitting units $312_1$ to $312_3$, and an output waveguide 315 that outputs the combined light.

Additionally, the RGB coupler 310 includes first to third monitoring waveguides $313_1$ to $313_3$ that output second one of the respective light split by the first to third splitting units $312_1$ to $312_3$ to the respective first to third monitoring wave-combining units $316_1$ to $316_3$, and first to third monitoring waveguides $317_1$ to $317_3$ that output the outputs of the respective first to third monitoring wave-combining units $316_1$ to $316_3$ to the corresponding PDs $302_1$ to $302_3$.

In the configuration of the light source shown in FIG. 5, the individual splitting units $312_1$ to $312_3$ split the respective light of R, G, and B before combining them. Therefore, the configuration of the two splitting units may be adapted for each color to provide a uniform split ratio and input the monitoring light split by the splitting units to the corresponding PDs directly. Unfortunately, inputting the monitoring light to the corresponding PDs directly may not reflect to the monitoring value the characteristics of the wave-combining unit 314 that outputs the RGB combined light 303. Therefore, in the configuration of the conventional technologies in FIG. 5, the split light is passed through dummy monitoring wave-combining units $316_1$ to $316_3$ of the same configuration as the wave-combining unit 314. The configuration of the RGB coupler in FIG. 5 needs three dedicated PDs for the respective colors and four three-input wave-combining units of the same configuration, which complicates and enlarges the entire configuration of the light source.

In discussing a way to avoid the problem of the wavelength dependence of the splitting unit 212 without the complicated configuration of the light circuit as shown in FIG. 5, the inventors focus on the fact that the split ratio of three colors departs to a significantly large value at the wavelength of R. The actual video device using the LDs has a combination of RGB wavelengths for the best color reproduction, but indeed the combination is determined by the wavelengths of R, G, and B of an LD that is easy to mass produce. For example, LDs of B (blue) near 445 nm, G (green) near 515 to 520 nm, and R (red) near 638 nm are mass produced. As B may damage eyes more for shorter wavelengths, it may be used at longer wavelengths (close to G), which will not increase the difference between the wavelengths of B and G. Then, the inventors have reached an idea of splitting R, G, and B separately. We have found a configuration of the light combining circuit that may solve or significantly reduce the problem of the wavelength dependence of the splitting unit, while keeping the simple entire configuration of the light source by using one PD detector as in the configuration of the RGB coupler in FIG. 4.

A light combining circuit and a light source of this disclosure include a first splitting unit for splitting light of wavelength R and a second splitting unit for splitting combined light of G and B, and split monochromatic light of R and combined light of G and B, independently. Therefore, each light of G and B from the LDs is first combined by a preliminary wave-combining unit before being split. The split light of each wavelength is combined by a main wave-combining unit to output combined light of RGB. Two split lights from the two splitting units are detected by a single PD. Splitting the monochromatic light of R and the combined light of G and B independently may provide a more uniform split ratio between three wavelengths of R, G, and B, while the single PD receives each light and monitors their levels. The light source of this disclosure may be combined with a video device that controls the three light sources by time division to largely simplify the video adjustment process such as the white balance.

First Embodiment

Figure 6:
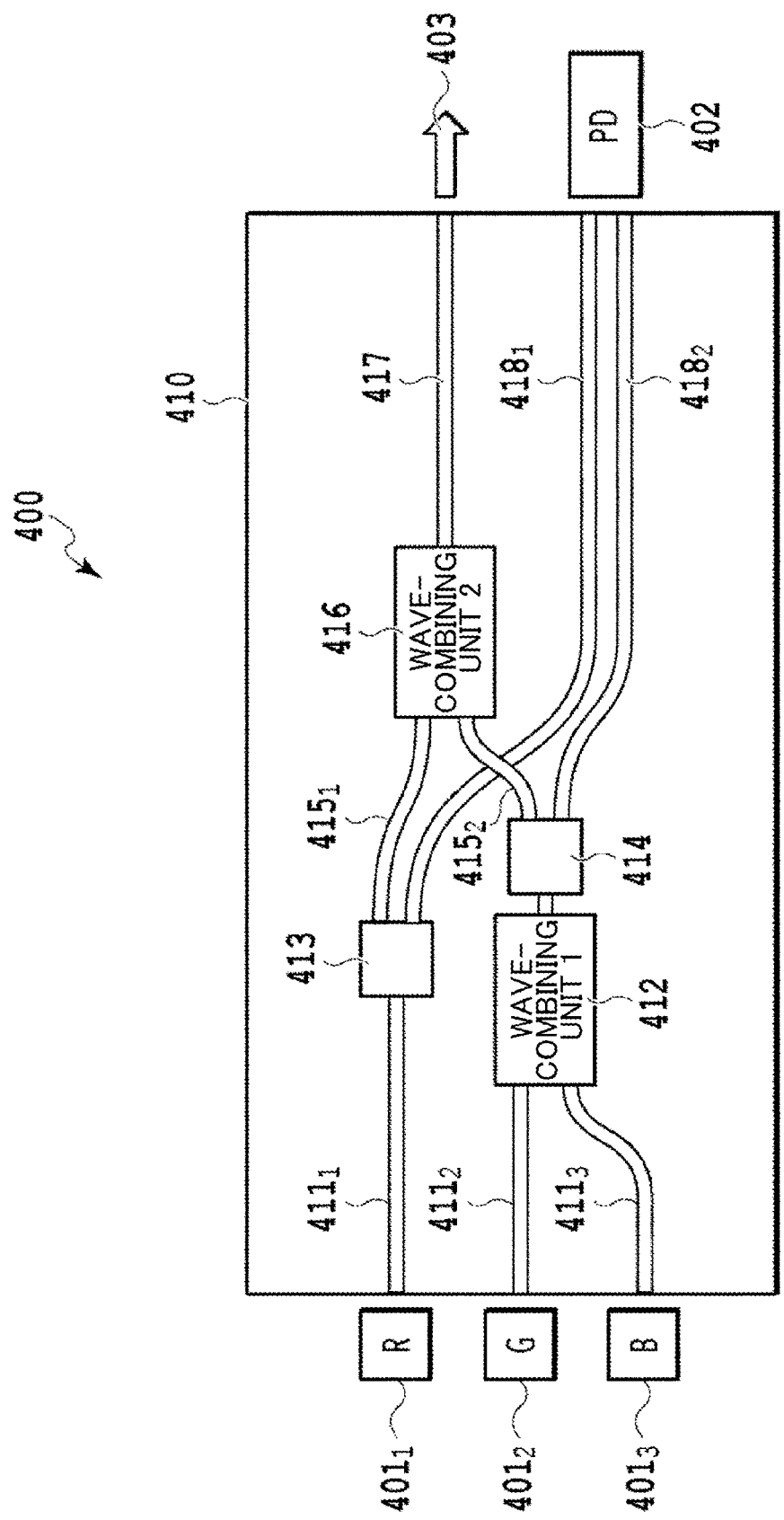
FIG. 6 illustrates a configuration of a light source with a monitoring function of a first embodiment.

FIG. 6 illustrates a configuration of a light source with a monitoring function of a first embodiment of this disclosure. A light source 400 in the first embodiment includes first to third LDs $401_1$ to $401_3$, an RGB coupler 410 that is a PLC type light circuit, and a PD 402 optically connected to the RGB coupler 410. The RGB coupler 410 includes input waveguides $411_1$ to $411_3$ corresponding to the first to third LDs, a main wave-combining unit 416 (a wave-combining unit 2) combining three colors of R, G, and B, and an output waveguide 417 outputting combined light 403. The RGB coupler 410 of this disclosure splits the three colors of R, G, and B separately using a first splitting unit 413 dedicated for R and a second splitting unit 414 for GB before combining them using the main wave-combining unit 416. Before splitting G and B, a preliminary wave-combining unit 412 (a wave-combining unit 1) combines each light of G and B from the second LD $401_2$ and third LD $401_3$. The second splitting unit 414 splits the combined GB light.

For the R light split by the first splitting unit 413 dedicated for R, first light is provided to the main wave-combining unit 416 through a split waveguide $415_1$ and second light is provided to the PD 402 through a monitoring waveguide $418_1$. For the GB light split by the second splitting unit 414 for G and B, first light is provided to the main wave-combining unit 416 through a split waveguide $415_2$ and second light is provided to the PD 402 through a monitoring waveguide $418_2$. The RGB coupler 410 functions as a light combining circuit.

As the waveguide distance between the two monitoring waveguides $418_1$ and $418_2$ may be for example as close as 30 μm, the single PD 402 may receive the split light from the two monitoring waveguides. In other words, the first and second monitoring waveguides $418_1$ and $418_2$ have respective terminations juxtaposed close to each other on one side end face of the substrate of the PLC circuit. As a normal PD has a size of about 0.75 mm square, one PD may receive lights from two waveguides. Therefore, a single PD may monitor lights as in the configuration in the conventional technologies shown in FIG. 4.

Therefore, the light combining circuit 410 of this disclosure may be implemented as including the first splitting unit 413 for splitting first wavelength light, the preliminary wave-combining unit 412 for combining second wavelength light and third wavelength light, the second splitting unit 414 for splitting the combined second wavelength light and the third wavelength light, the main wave-combining unit 416 for combining first split light from the first splitting unit and first split light from the second splitting unit, the output waveguide 417 for outputting the combined light from the main wave-combining unit, the first monitoring waveguide $418_1$ for outputting second split light from the first splitting unit, and the second monitoring waveguide $418_2$ for outputting second split light from the second splitting unit.

The light circuit of this disclosure, i.e., the RGB coupler 410 is different from the configuration in the conventional technologies in FIG. 4 in that the three colors of R, G, and B are split separately by the first splitting unit 413 dedicated for R and the second splitting unit 414 for GB. In the conventional technologies shown in FIG. 4, after the three colors of R, G, and B are combined, the RGB light is split by the single splitting unit in which the split ratio largely depends on the wavelength. In contrast, in the light circuit of this disclosure, the first splitting unit 413 dedicated for R splits only the monochromatic light of the wavelength R and the second splitting unit 414 for GB splits the combined light of G and B. By dividing the splitting units into two parts, the split ratios in the R waveband and the G and B wavebands may be set separately. Splitting the three colors of RGB by the single splitting unit as described above will provide a very non-uniform split ratio like R:G:B=23:5:1. Particularly, the split ratio at the R wavelength is larger than the split ratio at the wavelengths G and B. However, as shown in FIG. 6, dividing the splitting unit into two parts may optimize the split structure for each wavelength to largely reduce the wavelength dependence of the split ratio.

To divide the splitting unit into two parts as shown in FIG. 6, each light of G and B from the second and third LDs $401_2$ and $401_3$ needs to be combined previously by the preliminary wave-combining unit 412. In comparison with the configuration in FIG. 4, it is necessary to divide the splitting unit into two parts in the RGB coupler 410 and add the preliminary wave-combining unit 412. However, it is possible to keep the light source and the interface with PD and thus the PLC chip area only needs to be increased slightly. With the two splitting units 413 and 414, it is easy to set the split-side coupling rate appropriately. It is possible to control the wavelength dependence between the wavelengths G and B to about 2:1 at the most at the second splitting unit 414 for GB. Thus, it is possible to control the deviation of the split ratio between the three wavelengths of R, G, and B within twice. Additionally, by setting the split ratio of the first splitting unit 413 dedicated for R smaller than that of the second splitting unit 414 for GB, it is possible to control the wavelength dependence of the split ratio to about R:G:B=1: 1:0.5.

In the configuration of the conventional technologies in FIG. 4, the deviation between the three wavelengths reaches 23 times (26 dB). In contrast, in the configuration of the light combining circuit of this disclosure in FIG. 6, it is possible to control the monitoring value deviation in the PD at the wavelengths of R, G, and B within twice (6 dB). It is also possible to directly use the monitoring electrical signal from the PD 402 on the video device without physical conversion such as amplification/attenuation. In addition, it is also possible to use the monitoring signal on the video device side only by adding a slight correction to the monitoring signal. Thus, the detection signal of the PD 402 may become much easier to use as the monitoring function of the device side. The specific usage of the monitoring signal at the PD 402 will be described below.

As described above, in the light source with a monitoring function in the first embodiment, the first splitting unit 413 dedicated for R light splits only the monochromatic light of R and the second splitting unit 414 for GB light splits the combined light of G and B, before combining the RGB light. Additionally, by the single PD receiving the two split lights, it is possible to largely reduce the split ratio deviation between RGB while maintaining the small and simple configuration and provide an easy-to-use monitoring signal.

Second Embodiment

In the above first embodiment, the deviation of the split ratio between RGB may be largely reduced. But with respect to each split monitoring light received by the PD 402, the split light of R does not pass through the main wave-combining unit 416. Therefore, the monitoring output of R light does not reflect the combining characteristics (such as the wavelength dependence) that the RGB combined light 403 receives from the main wave-combining unit 416. The monitoring outputs of G and B also do not pass through the main wave-combining unit 416, but they pass through the preliminary wave-combining unit 412. Therefore, if the two wave-combining units 412 and 416 have the same characteristics, the monitoring outputs of G and B reflect the characteristics of the RGB combined light 403.

As described above, in the split light received by the PD 402, the split light of R does not correctly reflect the RGB combined light 403 obtained through the actual combining characteristics at the main wave-combining unit 416. As it does not correctly reflect the actual RGB combined light to be monitored, the configuration in the first embodiment is a little bit disadvantageous over the configuration in FIG. 4 in which light is split at the final part of the RGB coupler. Then, the light combining circuit of this embodiment has a configuration that reflects the characteristics of the main wave-combining unit by improving the first embodiment.

Figure 7:
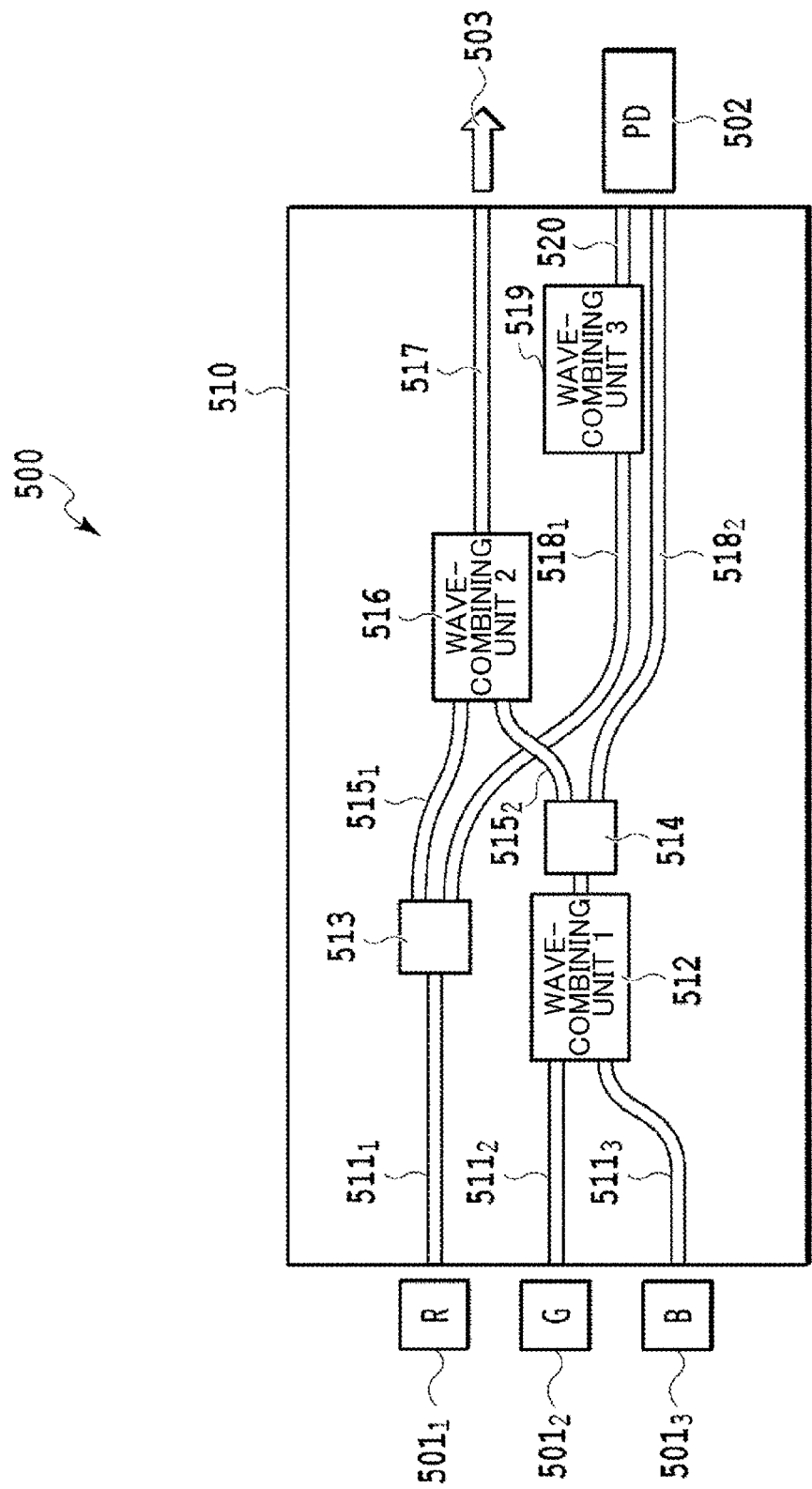
FIG. 7 illustrates a configuration of a light source with a monitoring function of a second embodiment.

FIG. 7 illustrates a configuration of a light source with a monitoring function of a second embodiment of this disclosure. A light source 500 of the second embodiment includes first to third LDs 501$_1$ to 501$_3$, an RGB coupler 510 that is the PLC type light circuit, and a PD 502 optically connected to the RGB coupler 510. The RGB coupler 510 includes input waveguides 511$_1$ to 511$_3$ corresponding to the first to third LDs 501$_1$ to 501$_3$, a main wave-combining unit 516 (a wave-combining unit 2) combining the three colors of R, G, and B, and an output waveguide 517 outputting combined light 503. The RGB coupler 510 functions as a light combining circuit.

Again in the second embodiment, the RGB coupler 510 splits the three colors of R, G, and B separately by a first splitting unit 513 dedicated for R and a second splitting unit 514 for GB before combining them at the main wave-combining unit 516. Before splitting G and B, each light of G and B from the second and third LDs 501$_2$ and 501$_3$ is combined at a preliminary wave-combining unit 512 (a wave-combining unit 1) as in the first embodiment. The difference from the first embodiment is that first split light of R light that is split by the splitting unit 513 is provided to the main wave-combining unit 516 through a waveguide 515$_1$ and second split light is provided to the PD 502 through a monitoring waveguide 518$_1$ and a dummy wave-combining unit 519 (a wave-combining unit 3). In other words, the second embodiment includes, in addition to the configuration in the first embodiment, the dummy wave-combining unit 519 (the wave-combining unit 3). The dummy wave-combining unit 519 is a monitoring wave-combining unit that is disposed in the middle of the first monitoring waveguides 518$_1$ and 520 and has the same configuration as the main wave-combining unit 516.

With respect to the GB light split by the second splitting unit 514 for G and B, first split light is provided to the main wave-combining unit 516 through a split waveguide 515$_2$ and second split light is provided to the PD 502 through a monitoring waveguide 518$_2$. The split light of R light from the dummy wave-combining unit 519 through the monitoring waveguide 520 and the split light of GB light from the monitoring waveguide 518$_2$ are received by the PD 502.

In the configuration of the light combining circuit in FIG. 7, the split light of R light toward the PD passes through the same transmission characteristics (the combining characteristics) as that of the RGB combined light 503 by passing through the dummy wave-combining unit 519 having the same configuration as the main wave-combining unit 516. For example, even if the combining characteristics depends on the wavelength, the misbalance between the wavelengths in the RGB combined light to be monitored is reflected to the monitoring detection value in each light at the PD. With the three wave-combining units 512, 516, and 519 that are the wave-combining units of the same configuration, each split monitoring light received by the PD reflects the same characteristics as the combining characteristics received by the actual RGB combined light 503, making it possible to monitor the RGB combined light 503 more accurately.

In comparison with the light combining circuit in the first embodiment, one more wave-combining unit is added, while it is possible to reduce the deviation of the split ratio between RGB more than in the conventional technologies and reflect the characteristics of the actual RGB combined light to the monitoring output more correctly.

Third Embodiment

In both of the above first and second embodiments, the light combining circuit includes a plurality of wave-combining units. Light not combined by the wave-combining unit provides stray light. Stray light entering the RGB light beam at the emitting part of the light circuit will disturb the beam profile. The stray light includes light that is output from the LD, not coupled to the input waveguide, and leaked inside the RGB coupler, light that is leaked or not completely combined at the wave-combining unit, and light that is leaked inside the RGB coupler through the discarding port of the wave-combining unit light, or the like. In this embodiment, the wave-combining unit is tilted from the emitting direction of the RGB combined light to minimize the effects of the stray light.

Figure 8:
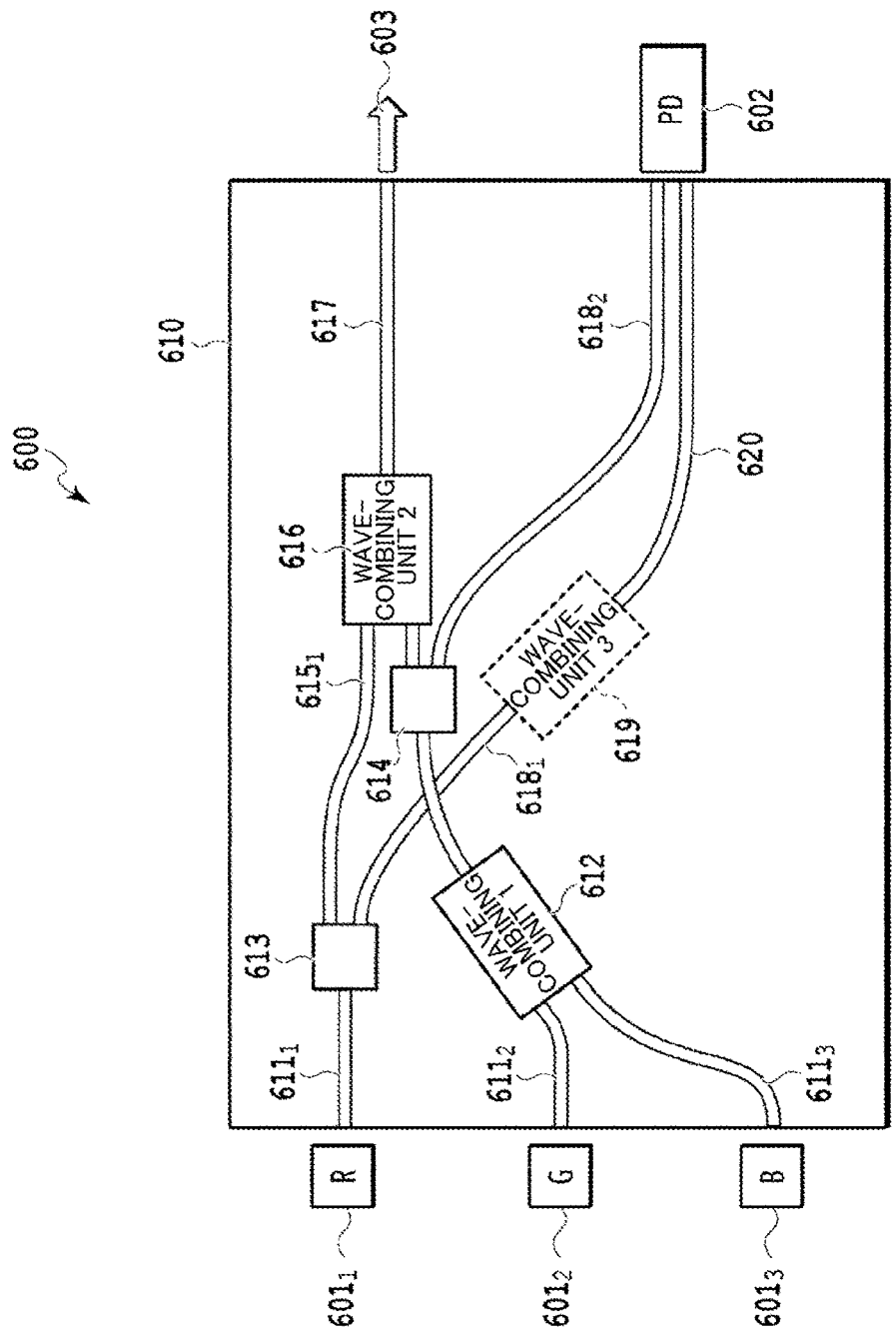
FIG. 8 illustrates a configuration of a light source with a monitoring function of a third embodiment.

FIG. 8 illustrates a configuration of a light source with a monitoring function of a third embodiment of this disclosure. A light source 600 in the third embodiment includes first to third LDs $601_1$ to $601_3$, an RGB coupler 610 that is the PLC type light circuit, and a PD 602 optically connected to the RGB coupler 610. The RGB coupler 610 includes input waveguides $611_1$ to $611_3$ corresponding to the first to third LDs, a main wave-combining unit 616 (a wave-combining unit 2) combining the three colors of R, G, and B, and an output waveguide 617 outputting combined light 503. The RGB coupler 610 functions as a light combining circuit.

The RGB coupler 610 in the third embodiment includes similar components to those in the RGB coupler 510 in the second embodiment: a preliminary wave-combining unit 612, a main wave-combining unit 616, a dummy wave-combining unit (a monitoring wave-combining unit) 619, a first splitting unit 613 dedicated for R, and a second splitting unit 614 for GB. The mutual connection relationship between the components is the same as that in the second embodiment, so its detailed description is omitted here. The difference from the RGB coupler in the second embodiment is the orientation of the preliminary and dummy wave-combining units 612 and 619 and the crossing positions of the waveguides. At the combiner, the stray light is often generated in the oblique direction to the emitting direction from its output port. Therefore, the output guided-wave direction (the emitting direction of the output light) of the preliminary and dummy wave-combining units 612 and 619 are tilted from the output guided-wave direction of the main wave-combining unit 616. Although FIG. 8 shows that the orientations of the two wave-combining units 612 and 619 are tilted, only one of them may be tilted.

By tilting two wave-combining units 612 and 619, the emitting directions of the two wave-combining units may be shifted from the direction of the RGB combined light 603 (the lateral direction in FIG. 8) to prevent the stray light from coupling to the RGB output light. There is also a merit that the chip size may be reduced in the direction (the lateral direction) from the light source to the emitting part in FIG. 8. Typically, in the RGB coupler including the PLC, the LD is optically coupled to one side of the chip and the RGB combined light 603 is emitted from the opposite side. Therefore, the chip is elongated in the direction along the RGB combined light 603. As in FIG. 8, the emitting directions of the two wave-combining units may be shifted from that direction to provide a small chip size in the emitting direction of the RGB combined light 603.

Fourth Embodiment

In the above third embodiment, the orientations of some of the wave-combining units may be tilted from the emitting direction of the RGB combined light to prevent the stray light from the wave-combining unit from coupling to the RGB combined output. However, the waveguides connecting the wave-combining units need to be bent to tilt the orientations of the wave-combining units. By bending the waveguides, light may be leaked at the bend sections of the waveguides. In such a case, the emitting position of the RGB combined light at the chip end may also be shifted while keeping the orientation of the wave-combining unit along the emitting direction of the RGB combined output.

Figure 9:
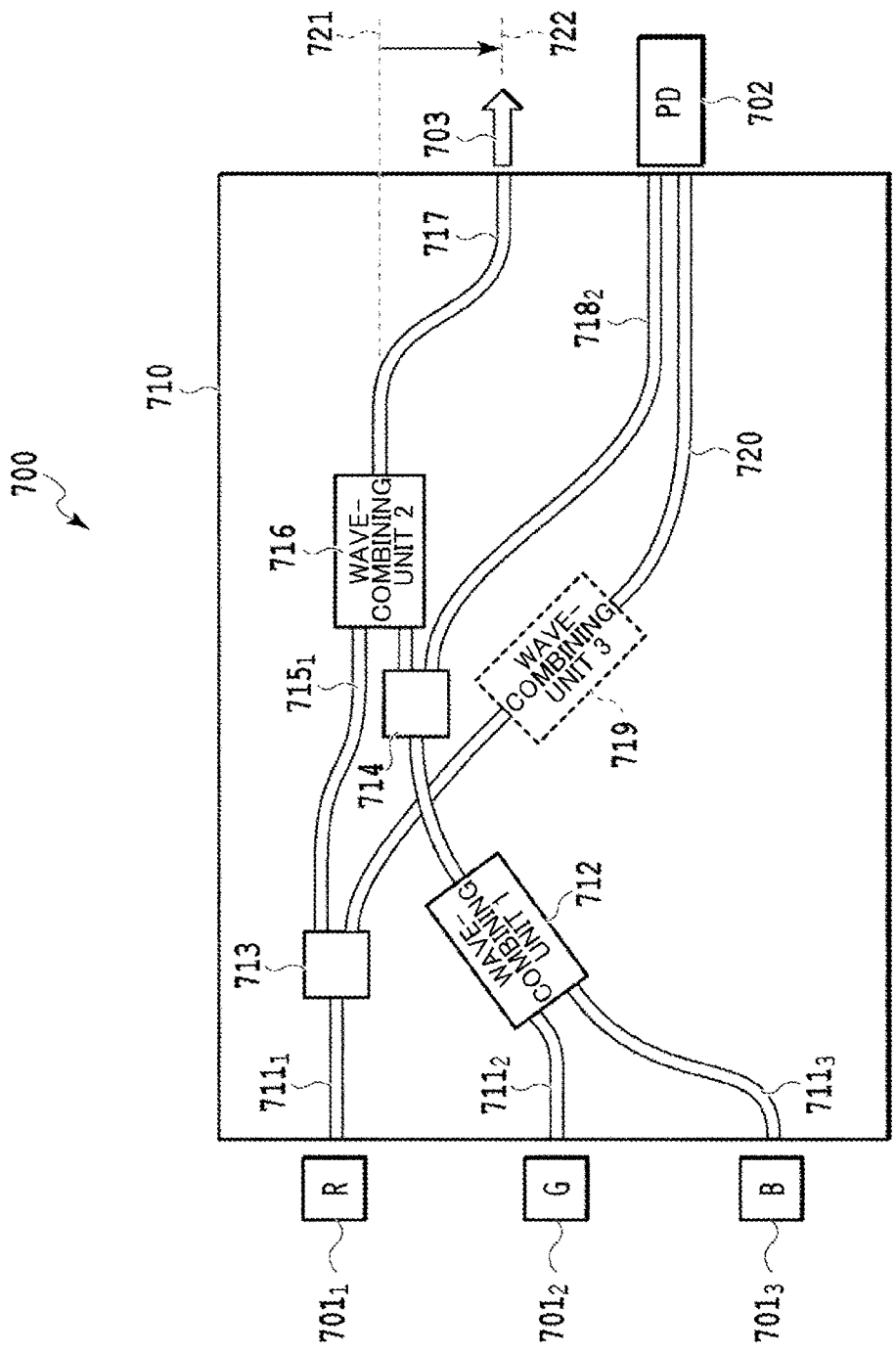
FIG. 9 illustrates a configuration of a light source with a monitoring function of a fourth embodiment.

FIG. 9 illustrates a configuration of a light source with a monitoring function of a fourth embodiment of this disclosure. A light source 700 in the fourth embodiment includes first to third LDs $701_1$ to $701_3$, an RGB coupler 710 that is the PLC type light circuit, and a PD 702 optically connected to the RGB coupler 710. The RGB coupler 710 includes input waveguides $711_1$ to $711_3$ corresponding to the first to third LDs, a main wave-combining unit 716 (a wave-combining unit 2) combining the three colors of R, G, and B, and an output waveguide 717 outputting combined light 703. The RGB coupler 710 functions as a light combining circuit.

The difference from the RGB coupler 610 in the third embodiment shown in FIG. 8 is only the configuration of the output waveguide 717 that emits the RGB combined light 703. In the RGB coupler 710 in this embodiment, the termination of the output waveguide from the main wave-combining unit 716 is shifted from the extension of the output point along the chip end. In other words, the output waveguide 717 has a termination at the position 722 shifted from the extension 721 that extends from the output point of the main wave-combining unit 716 in the guided wave direction.

In the example in FIG. 9, the direction of light input/output from the main wave-combining unit 716 matches the directions of the four sides of the chip. However, even if the orientation of the main wave-combining unit that emits the RGB combined light is tilted from the four sides of the chip, the termination position of the output waveguide may be shifted from the crossing point between the extension 721 of the output point of the main wave-combining unit and the chip end. In this case, as the extension and the sides of the chip are not orthogonal, the output waveguide is bent near the termination so that the waveguide is terminated perpendicular to the chip end face.

The configuration of the output waveguide 717 may be directly applied to the output waveguide 417 in the first embodiment, the output waveguide 517 in the second embodiment, and the output waveguide 617 in the third embodiment.

Fifth Embodiment

Figure 10:
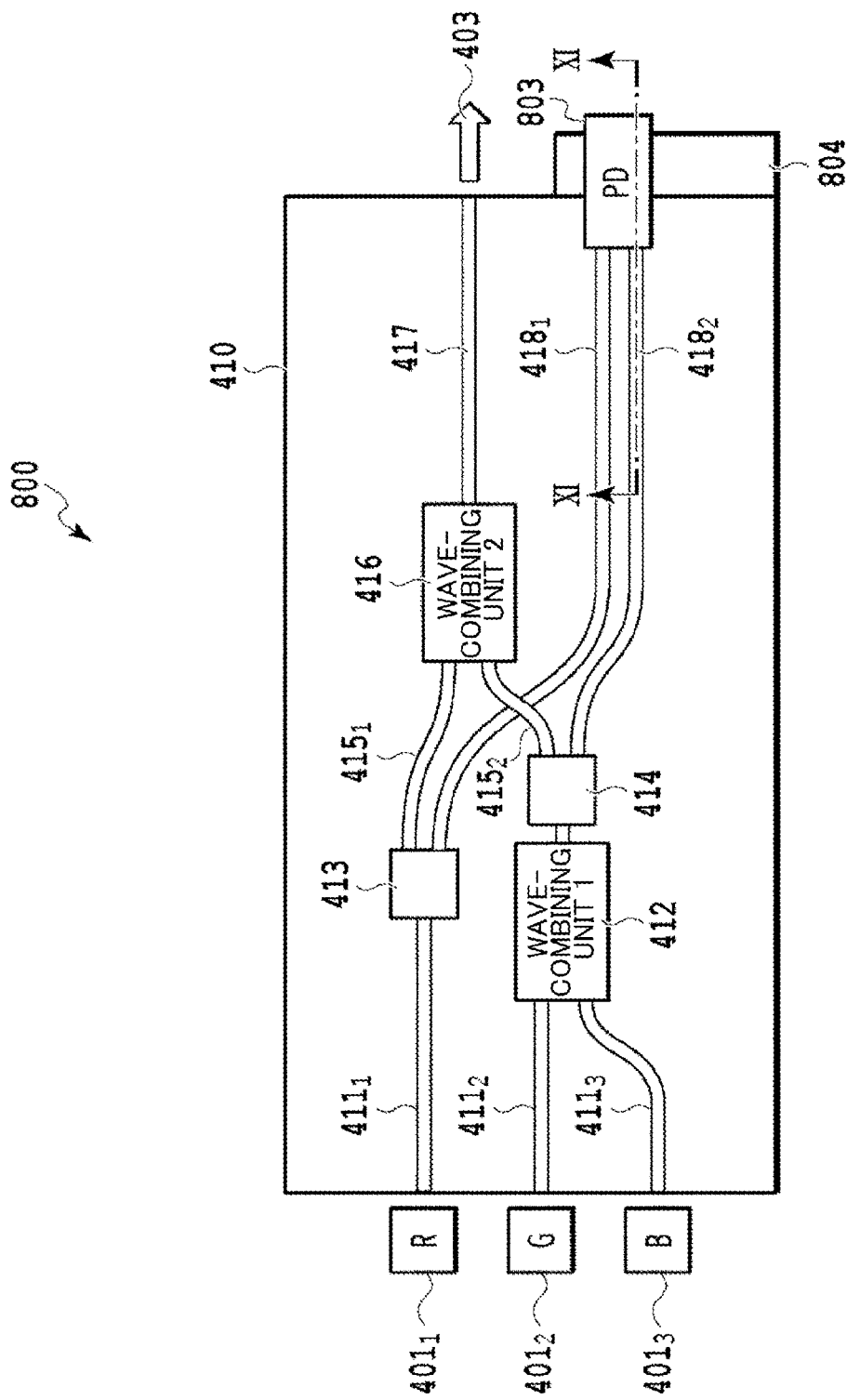
FIG. 10 illustrates a configuration of a light source with a monitoring function of a fifth embodiment.

FIG. 10 illustrates a configuration of a light source with a monitoring function of a fifth embodiment of this disclosure. A light source 800 in the fifth embodiment is the same as the light source 400 in the first embodiment only except that a PD 803 is mounted in a different way. Therefore, a description is given only about how to mount the PD. The light source 800 includes a flip-up mirror 804 at the emitting end of the two monitoring waveguides $418_1$ and $418_2$. The flip-up mirror 804 converts the optical path of the incident light by 90 degrees.

Figure 11:
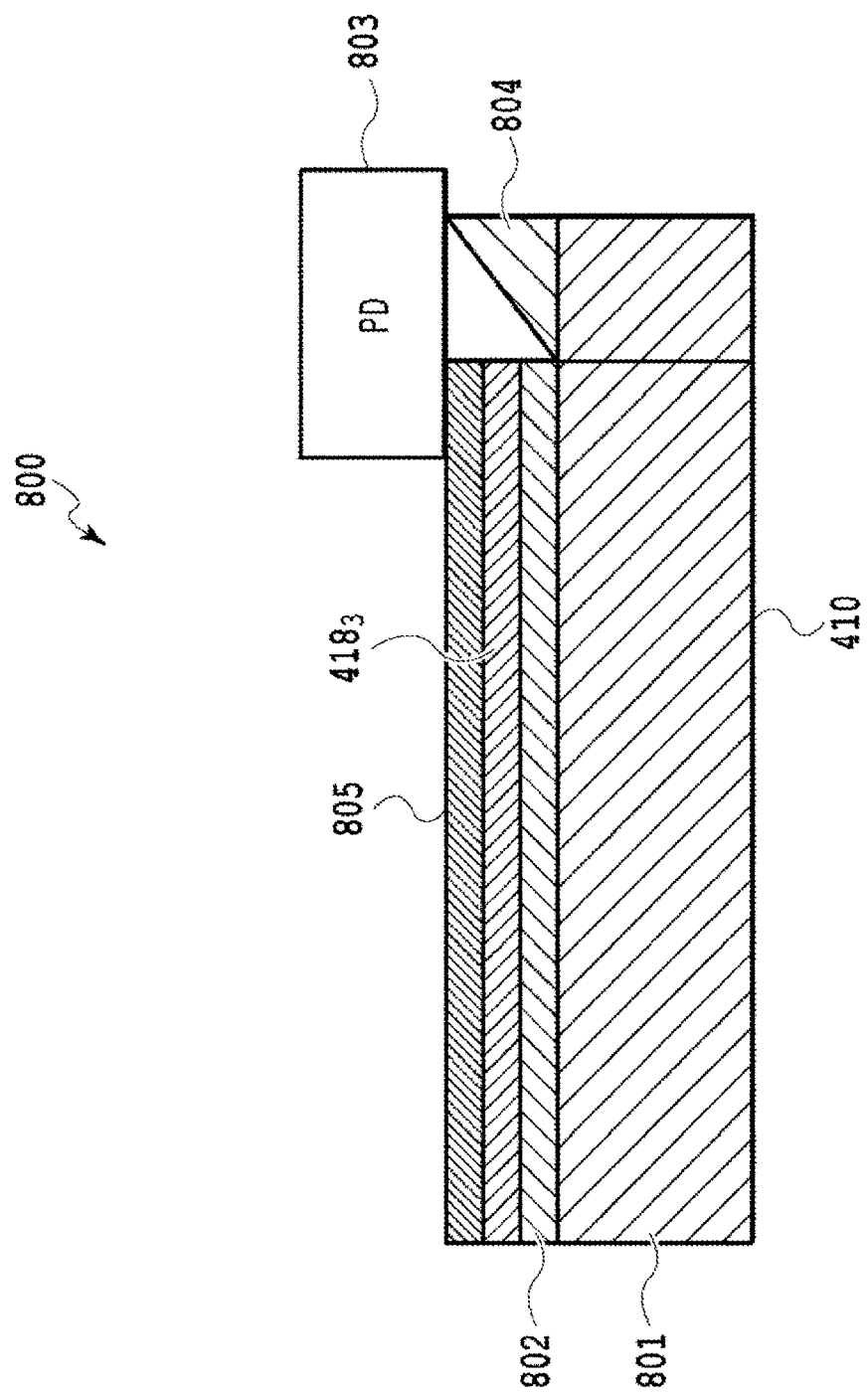
FIG. 11 illustrates a cross-section near an emitting end of a monitoring waveguide and a PD.

FIG. 11 illustrates the cross-section structure near the emitting end of the monitoring waveguide and the PD. FIG. 11 shows the cross-section perpendicular to the substrate surface of the PLC taken along line XI-XI in FIG. 10. The RGB coupler 410 includes an underclad layer 802 and a core layer that are sequentially stacked on a substrate 801. Light circuits are formed in the core layer, including the waveguide, the splitting unit, and the wave-combining unit. Finally, an overclad layer 805 is formed to cover these formed light circuits.

This embodiment uses the PD 803 of a surface mount type. The flip-up mirror 805 reflects the light emitted from the monitoring waveguides 418₁ and 418₂ above the substrate into the PD 803. The flip-up mirror 805 includes a substrate separately made of Si or the like. The substrate has an inclined surface of 45 degrees and is attached to the exit end plane of the RGB coupler 410. Moreover, the flip-up mirror 805 may also be made by fabricating an inclined surface of 45 degrees in the middle of the monitoring waveguide by dry etching a substrate tilted at 45 degrees.

In the configuration of the light source in the fifth embodiment, the PD 803 may be disposed not to face the exit planes of the LDs 401₁ to 401₃, making it difficult for the stray light to enter the PD 803 and reducing the mounting area of the light source 800. Of course, it will be apparent that the method of mounting the PD on the light source in the fifth embodiment shown in FIGS. 10 and 11 may apply to any of the first to fourth embodiments described above.

Sixth Embodiment

Figure 12:
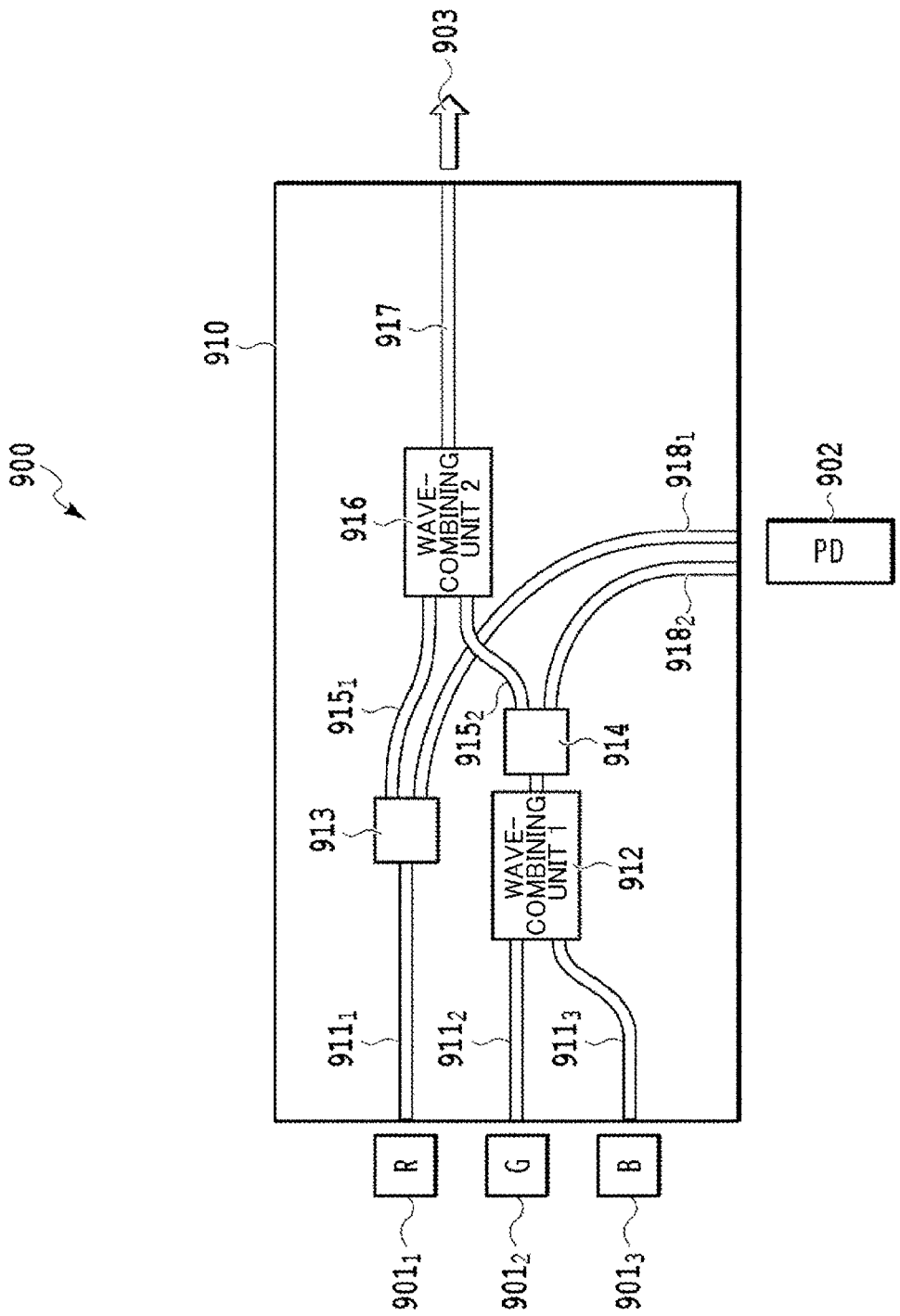
FIG. 12 illustrates a configuration of a light source with a monitoring function of a sixth embodiment.

FIG. 12 illustrates a configuration of a light source with a monitoring function of a sixth embodiment of this disclosure. A light source 900 in the sixth embodiment is the same as the light source 400 in the first embodiment except for the position of a PD 902. The light source 900 in the first embodiment includes first to third LDs 901₁ to 901₃, an RGB coupler 910 that is the PLC type light circuit, and a PD 902 optically connected to the RGB coupler 910. The RGB coupler 910 has a configuration in which two monitoring waveguides 918₁ and 918₂ terminate on a side perpendicular to the chip side for an output waveguide 917 of an RGB combined light 903, as bent waveguides for optical path conversion of 90 degrees.

As shown in the first to fourth embodiments, disposing the PD to face the exit planes of the three LDs will allow the stray light to enter the PD, so that inaccurate monitoring values may be provided. Therefore, in the light source and RGB coupler in this embodiment, the two monitoring waveguides 918₁ and 918₂ are used as bent waveguides for optical path conversion of 90 degrees so that the LDs and PD should not face each other. With the configuration in which the emitting direction of each light from the three LDs and the emitting direction of the light from the main wave-combining unit 916 are generally perpendicular to the incident direction of the light to the PD 902, it is possible to avoid the stray light from entering the PD 902.

It will be appreciated that the configuration in which the monitoring waveguide in this embodiment is used as a bent waveguide for optical path conversion of 90 degrees may apply to any of the above first to fifth embodiments.

In the light source with the monitoring function in each of the above embodiments, the single PD may monitor each light of R, G, and B. As it is possible to control the deviation of the split ratio between light of each color detected by the PD to twice at the most (within 6 dB), knowing the value of the inter-wavelength variation of the split ratio in advance makes it possible to easily correct the detection value of the PD on the device side using the light source of this disclosure. As the signal value detected by the PD has a difference of at most 6 dB between the three colors, it is not necessary to even physically change (amplify/attenuate) the detected electrical signal from the PD for each color. In the RGB coupler in each of the above embodiments, the split ratio is generally set to main: monitoring=9:1 as an example. As the variation of the light level observed in the monitoring waveguide is within the deviation of 6 dB, no special specifications are required for the PD detection dynamic range. It may help reduce the cost as the RGB light source.

Additionally, in a video device using the light source of this disclosure, if the R light source, the G light source, and the B light source are operated independently at different times during the period not used as the actual video signal, the monitoring value may be obtained for the monochromatic light. This may associate (calibrate) a known calibrated output level from the monochromatic LD with the monitoring value by the PD correctly. For example, at the sweep time of a video signal in a peripheral area not displayed to the user as a video, only a single light source may emit light. By repeating multiple measurements during a predetermined measurement period for each scan of the video signal and at a constant number of scans, a monitoring value for each color alone may be easily obtained. Typically, the response speeds of the PD and LD are about several μsec to some ten μsec, which are much higher than the frame speed of the above video signal. Therefore, without affecting the display of the actual video, it is possible to monitor the monochromatic light of R, G, and B. The light combining circuit and light source of this disclosure make it possible to monitor LD light with very high accuracy and adjust the white balance with higher accuracy, by cooperating with an operation of controlling each LD by time division using the device with which the light combining circuit and light source are used in combination.

As described in detail above, the light combining circuit and light source of this disclosure may solve or reduce the problem of the wavelength dependence of the split ratio and provide a monitoring function that is easy to use in a video device.

INDUSTRIAL

The present invention may be generally used in an optical communication system.

REFERENCE SIGNS LIST 1 to 3, 21 to 23, 201₁ to 201₃, 301₁ to 301₃, 401₁ to 401₃, 501₁ to 501₃, 601₁ to 601₃, 701₁ to 701₃, 901₁ to 901₃ LD
13 to 15, 202, 302₁ to 302₃, 402, 502, 602, 702, 803, 902 PD
31 to 33, 101 to 103, 211₁ to 211₃, 311₁ to 311₃, 411₁ to 411₃, 511₁ to 511₃, 611₁ to 611₃, 711₁ to 711₃, 911₁ to 911₃ Input waveguide
36, 203, 303, 403, 503, 603, 703, 903 RGB combined light
106, 215, 315, 417, 517, 617, 717, 917 Output waveguide
200, 300, 400, 500, 600, 700, 800, 900 Light source with a monitoring function
210, 310, 410, 510, 610, 710, 810, 910 RGB coupler
212, 312₁ to 312₃, 413, 414, 513, 514, 613, 614, 713, 714, 913, 914 Splitting unit
213, 317₁ to 317₃, 418₁, 418₂, 518₁, 518₂, 520, 618₁, 618₂, 620, 720, 918₁, 918₂ Monitoring waveguide
214, 314, 416, 516, 616, 716, 916 Main wave-combining unit
316₁ to 316₃, 519, 619, 719, 919 Dummy wave-combining unit (Monitoring wave-combining unit)
412, 512, 612, 712, 912 Preliminary wave-combining unit
804 Flip-up mirror

The invention claimed is:
1. A light combining circuit comprising:
a first splitting unit for splitting first wavelength light;

a preliminary wave-combining unit for combining second wavelength light and third wavelength light;

a second splitting unit for splitting the combined second wavelength light and third wavelength light;

a main wave-combining unit for combining first split light from the first splitting unit and first split light from the second splitting unit;

an output waveguide for outputting the combined light from the main wave-combining unit;

a first monitoring waveguide for outputting second split light from the first splitting unit; and a second monitoring waveguide for outputting second split light from the second splitting unit.

2. The light combining circuit according to claim 1, wherein the first and second monitoring waveguides include respective terminations juxtaposed close to each other.

3. The light combining circuit according to claim 2, further comprising:

a monitoring wave-combining unit disposed in the middle of the first monitoring waveguide, the monitoring wave-combining unit having the same configuration as the main wave--combining unit.

4. The light combining circuit according to claim 2, wherein the output waveguide has a termination at a position shifted from the extension in the guided wave direction from the output point of the main wave-combining unit.

5. The light combining circuit according to claim 2, wherein the first and second monitoring waveguides are bent waveguides for optical path conversion and configured so that the light emitting direction from the main wave-combining unit is generally perpendicular to the optical axes of the first and second monitoring waveguides.

6. A light source with a monitoring function comprising:

the light combining circuit according to claim 2;

three laser diodes for outputting the first wavelength light, the second wavelength light, and the third wavelength light, respectively; and a photo diode optically coupled to the first and second monitoring waveguides.

7. A light source with a monitoring function comprising:

the light combining circuit according to claim 1;

three laser diodes for outputting the first wavelength light, the second wavelength light, and the third wavelength light, respectively; and a photo diode optically coupled to the first and second monitoring waveguides.

8. The light source with a monitoring function according to claim 7, wherein the three laser diodes output the three primary colors light of R(red light), G(green light), and B(blue light), respectively.

9. The light combining circuit according to claim 1, wherein the output waveguide has a termination at a position shifted from the extension in the guided wave direction from the output point of the main wave-combining unit.

10. A light source with a monitoring function comprising:

the light combining circuit according to claim 5;

three laser diodes for outputting the first wavelength light, the second wavelength light, and the third wavelength light, respectively; and a photo diode optically coupled to the first and second monitoring waveguides.

11. The light combining circuit according to claim 1, further comprising:

a monitoring wave-combining unit disposed in the middle of the first monitoring waveguide, the monitoring wave-combining unit having the same configuration as the main wave-combining unit.

12. A light source with a monitoring function comprising:

the light combining circuit according to claim 11;

three laser diodes for outputting the first wavelength light, the second wavelength light, and the third wavelength light, respectively; and a photo diode optically coupled to the first and second monitoring waveguides.

13. The light combining circuit according to claim 11, wherein the output waveguide has a termination at a position shifted from the extension in the guided wave direction from the output point of the main wave-combining unit.

14. The light combining circuit according to claim 11, wherein the first and second monitoring waveguides are bent waveguides for optical path conversion and configured so that the light emitting direction from the main wave-combining unit is generally perpendicular to the optical axes of the first and second monitoring waveguides.

15. The light combining circuit according to claim 11, wherein at least one of the preliminary wave-combining unit or the monitoring wave-combining unit has an output guided-wave direction inclined to an output guided-wave direction of the main wave-combining unit.

16. The light combining circuit according to claim 15, wherein the output waveguide has a termination at a position shifted from the extension in the guided wave direction from the output point of the main wave-combining unit.

17. The light combining circuit according to claim 15, wherein the first and second monitoring waveguides are bent waveguides for optical path conversion and configured so that the light emitting direction from the main wave-combining unit is generally perpendicular to the optical axes of the first and second monitoring waveguides.

18. A light source with a monitoring function comprising:

the light combining circuit according to claim 15;

three laser diodes for outputting the first wavelength light, the second wavelength light, and the third wavelength light, respectively; and a photo diode optically coupled to the first and second monitoring waveguides.

19. The light combining circuit according to claim 1, wherein the first and second monitoring waveguides are bent waveguides for optical path conversion and configured so that the light emitting direction from the main wave-combining unit is generally perpendicular to the optical axes of the first and second monitoring waveguides.

20. A light source with a monitoring function comprising:

the light combining circuit according to claim 19;

three laser diodes for outputting the first wavelength light, the second wavelength light, and the third wavelength light, respectively; and a photo diode optically coupled to the first and second monitoring waveguides.

* * * * *